United States Patent
Altena et al.

[11] Patent Number: 5,904,831
[45] Date of Patent: May 18, 1999

[54] METHOD OF ELECTROCHEMICALLY MACHINING WORKPIECES

[75] Inventors: Hermanus S. J. Altena; Maarten Brussee; Foppe Kramer, all of Drachten, Netherlands

[73] Assignee: U.S. Philips Corporation, New York, N.Y.

[21] Appl. No.: 08/923,851

[22] Filed: Sep. 4, 1997

[30] Foreign Application Priority Data

Sep. 13, 1996 [EP] European Pat. Off. ............. 96202566

[51] Int. Cl.$^6$ ...................................................... B23H 9/14
[52] U.S. Cl. ........................................... 205/652; 205/665
[58] Field of Search ........................ 205/665; 204/224 M, 204/652

[56] References Cited

U.S. PATENT DOCUMENTS

| | | | |
|---|---|---|---|
| 3,383,296 | 5/1968 | Trager | 205/665 |
| 3,749,654 | 7/1973 | Mikulski | 205/665 |
| 3,972,797 | 8/1976 | Hagen et al. | 204/290 R |
| 4,387,014 | 6/1983 | Stengel | 204/212 |
| 4,997,534 | 3/1991 | Thornton | 204/290 F X |
| 5,507,925 | 4/1996 | Brew | 205/665 X |
| 5,783,061 | 7/1998 | Schuurman et al. | 205/673 |

FOREIGN PATENT DOCUMENTS

4002700A1  8/1990  Germany.

*Primary Examiner*—Donald R. Valentine
*Attorney, Agent, or Firm*—Ernestine C. Bartlett

[57] ABSTRACT

The invention relates to a method of forming one or more through-holes in a metal workpiece, such as shaving foils or shaving combs, by means of an electrochemical machining apparatus (ECM apparatus). To this end, the method is characterized in that, during machining, the workpiece is provided on a substrate of an electroconductive, electrochemically inert material, such as a noble metal (alloy), in particular a noble metal (alloy) which is predominantly composed of Pt. Preferably, the workpiece is clamped onto the substrate. By virtue of said measures, rounding of the edges between the holes formed and the surface of the workpiece, which is clamped down on the substrate during machining, is reduced substantially. This has a favorable effect on the formation of sharp cutting faces.

27 Claims, 2 Drawing Sheets

METHOD OF ELECTROCHEMICALLY MACHINING WORKPIECES

BACKGROUND OF THE INVENTION

The invention relates to a method of forming one or more through-holes in a metal workpiece by means of an electrochemical machining apparatus (ECM apparatus). The invention also relates to a workpiece manufactured in accordance with this method.

SUMMARY OF THE INVENTION

A method of the type mentioned in the opening paragraph is disclosed, for example, in DE 40.02.700. As described in said Patent document, the electrochemical machining (abbr. ECM) of workpieces takes place in an electrolyte solution having a high ion density. In said process, the workpiece to be machined serves as the anode and the electrode of the ECM apparatus as the cathode. During electrochemical machining, an electric current is applied between the anode and the cathode. Under these conditions, the electrode serves as a shaping tool. During machining, the workpiece, which serves as the anode, dissolves locally, for example in the form of metal hydroxide(s), while hydrogen is formed at the electrode surface. This electrochemical machining method enables (patterns of) arbitrarily shaped through-holes to be formed in a metal workpiece in a relatively simple and accurate manner.

Said known method has an important drawback. The edges formed by the through-holes at the location of both surfaces of the workpiece exhibit roundings. The degree of rounding is found to be most significant at the surface of the workpiece facing the ECM electrode. However, also at the other surface of the workpiece a considerable degree of rounding of the edges around the holes occurs. In the latter case, the radius of rounding generally exceeds 20 micrometers. The radius of rounding is defined as the radius of the best fitting circle in a section through the hole, the circle being determined at right angles to the exit surface.

For various applications of the workpiece, radii of rounding of such magnitude are undesirable, in particular, if the edge formed is to be used as a cutting face. This is the case, for example, if the finished workpiece must be used as a shaving foil or a shaving comb for a shaver.

It is an object of the invention to obviate the above-mentioned drawback. The invention more particularly aims at providing a method of electrochemically forming one or more holes in a workpiece, in such a manner that the edges formed around the holes in the machining operation exhibit a substantially reduced degree of rounding. The radius of rounding of the holes formed by the method in accordance with the invention should be smaller than 10 micrometers, preferably smaller than 5 micrometers, at a surface of the workpiece.

These and other objects of the invention are achieved by a method of providing one or more through-holes in a metal workpiece by means of an electrochemical machining apparatus (ECM apparatus), which method is characterized in accordance with the invention in that, during the machining operation, the workpiece is provided on a substrate of an electroconductive, electrochemically inert material.

The invention is based on the experimentally gained insight that the provision of the workpiece on a substrate of an electroconductive, electrochemically inert material has a favorable effect. For example, it has been established that, under these conditions, rounding at the surface of the workpiece facing away from the electrode is reduced substantially. It has been found that the measure in accordance with the invention enables roundings to be formed whose radius is smaller than 10 micrometers and, under optimum conditions, even smaller than 5 micrometers.

For the electroconductive, electrochemically inert substrate use can be made of several materials. For example, use can be made of materials composed of electrochemically inert metals or metal alloys, such as materials which are predominantly (i.e. in excess of 80 wt. %) composed of Pd, Ir, Ti and/or Rh. The substrate may be manufactured entirely from such an alloy or metal. Often it proves to be advantageous to provide only the surface of the substrate contacting the workpiece with a thin layer of this material. This leads to a saving in costs.

In accordance with a favorable example of the method in accordance with the invention, use is made of an electrochemically inert material which is predominantly composed of (an alloy of) a noble metal. This is to be understood to mean in this context, inter alia, materials comprising predominantly (i.e. in excess of 80 wt. %) Ag and/or Au. Substrates of these materials prove to be very durable under customary ECM conditions. Alloys comprising predominantly (i.e. in excess of 80 wt. %) Pt prove the most durable. Therefore, these alloys are preferred.

It is noted that in the non-prepublished Patent Application having Application no. 95203032.8, which corresponds substantially to U.S. Pat. No. 5,738,777 issued Apr. 14, 1998 (PHN 15.539), a description is given of a similar method. In said method use is made of an auxiliary layer which is provided on the surface of the workpiece to be processed facing away from the electrode. By way of example, sacrificial layers of metal are mentioned in said application. These sacrificial layers are not electrochemically inert.

Another advantageous embodiment of the method in accordance with the invention is characterized in that, during machining, the workpiece is clamped onto the substrate. By virtue thereof, the workpiece is rigidly attached to the substrate. As a result, the rounding at the surface engaging the substrate is further reduced. This measure is important, in particular, if for the workpiece use is made of a relatively thin metal foil.

The last-mentioned measure in accordance with the invention can be carried out by means of various clamping means. For example, the workpiece can be attached to the substrate by means of one or more mechanical clamps. Preferably, the workpiece is clamped down on a porous substrate via a vacuum-exhaust process. If use is made of a workpiece of a magnetic material, said workpiece can be advantageously clamped down on the substrate under the influence of magnetic forces.

Another interesting embodiment of the present invention is characterized in that the substrate contains one or more holes which are arranged to receive the one or more parts of the electrode during machining. This embodiment makes it possible to obtain even sharper edges compared with embodiments in which substrates without holes are used. This is especially true in cases wherein the axes of the holes to be machined in the workpiece are oblique. The diameter of the holes need to be somewhat larger than the diameter of the corresponding electrode parts.

An interesting embodiment of the method in accordance with the invention is characterized in that the distance between the electrode and the workpiece is periodically increased and during said increase, the flow of electric current between the workpiece and the electrode is interrupted.

In order to obtain an accurate impression of the electrode in the foil, the distance from the electrode to the foil should be small during machining. In practice, this distance is approximately 10–50 micrometers. As a result, the rinsing capacity of the electrolyte, which serves to discharge the by-products, such as metal hydroxides, formed during machining is relatively low. The rinsing capacity is improved by said periodic increase of the distance between the electrode and the workpiece, for example, up to several hundred micrometers. During this increase of the distance, the electric current between the workpiece and the electrode should be interrupted. This measure leads to a higher precision and reproducibility of the through-holes formed.

By means of experiments, it has been established that various types of metal workpieces can be very advantageously machined by means of the method in accordance with the invention. It has been found that the method is very suitable for forming patterns of holes in metal foils, for example metal foils used for the manufacture of shaving foils and shaving combs. A small radius of rounding of the edges between the holes formed and a surface of the workpiece is very important in this type of workpiece. The small radius of rounding causes these edges to be relatively sharp, so that they can be used as cutting faces.

In principle, all metals and metal alloys which can be electrochemically machined can be used as the material for the workpiece. Metal alloys of the chromium-steel type prove to be very suitable. Chromium steel preferably contains about 13 wt. % Cr. A very interesting type of chromium steel is the so-called maraging steel. Good results have been achieved with CrNi-containing maraging types of steel, which also contain a few percent of Cu and Mo as well as minor quantities of Al, Ti, Si and C.

These and other aspects of the invention will be apparent from and elucidated with reference to the embodiments described hereinafter.

It is noted that, for clarity, the Figures are not drawn to scale.

DESCRIPTION OF THE PREFERRED EMBODIMENTS

Figure 1A:
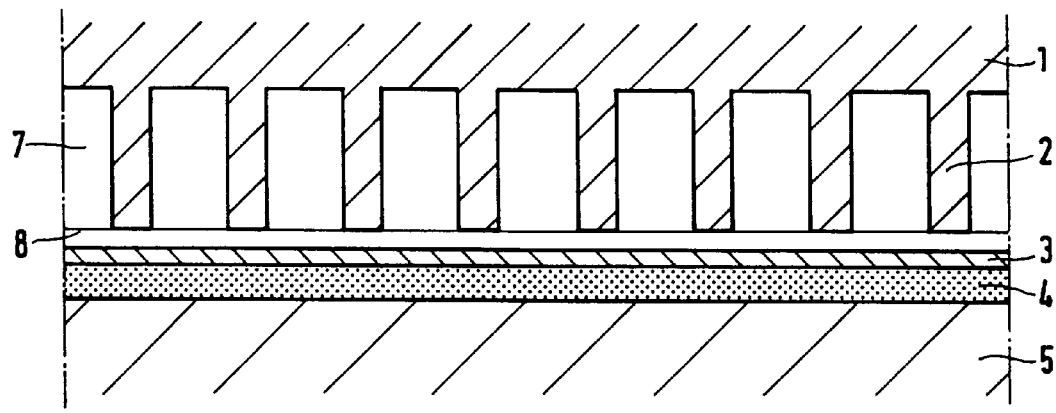
FIGS. 1A and 1B schematically shows a number of steps of the method in accordance with the invention.
Figure 1B:
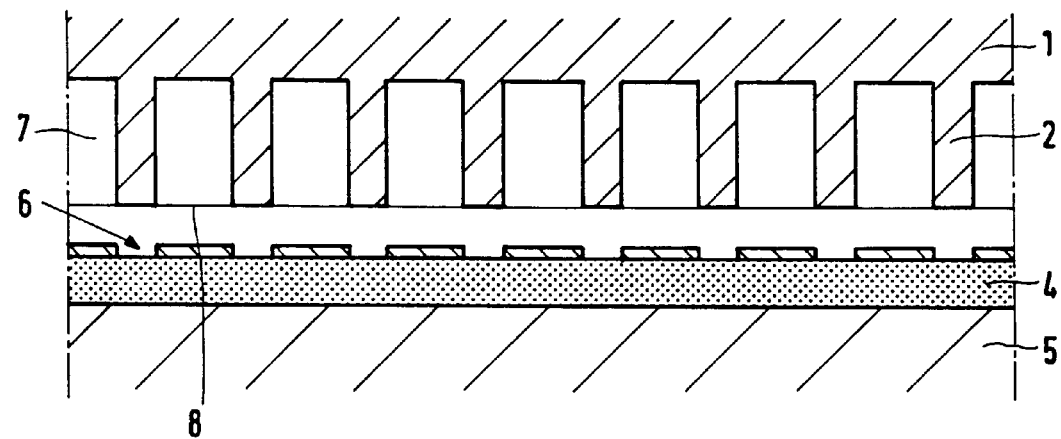

The process in accordance with the invention is further explained by means of the schematic illustration shown in FIGS. 1A and 1B. Reference numeral 1 indicates (in section) a part of the electrode of an ECM apparatus (not shown in detail). This electrode comprises eight sub-electrodes 2, which may have any shape. Said sub-electrodes are at a short distance from and directed towards a metal workpiece 3, which is made, for example, of chromium steel and which is in the form of a thin foil. The workpiece is clamped onto a substrate 4 of an electroconductive, electrochemically inert material. Said substrate preferably contains a number of holes which are arranged to receive the sub-electrodes of the electrode during machining (not shown). In this case, said material consisted of a thin layer of, predominantly, Pt which was provided on a ceramic support 5. For clarity, the mechanical clamping means used to carry out the method in accordance with the invention are not shown.

During electrochemical machining, the sub-electrodes and the workpiece are situated in a solution having a high-ion density, for example, a solution of 0.8 M sodium nitrate. A voltage is applied between the sub-electrodes and the workpiece, the polarity being chosen so that the electrode serves as the cathode and the workpiece as the anode. In this case, a voltage of 9–10 V was applied.

The illustration shown in FIG. 1-A shows the situation at the beginning of the method in accordance with the invention. At this stage, the electrode and the workpiece are at a distance of approximately 20 micrometers from each other. After applying a voltage across the electrode and the metal foil, a pattern of through-holes 6 is formed in the foil after some time (see FIG. 1-B).

To increase the accuracy and reproducibility of the holes formed, the distance between the electrode and the foil is periodically increased from 20 micrometers to approximately 250 micrometers. By virtue thereof, the rinsing effect of the electrolyte between the foil and the electrodes is increased. The voltage is interrupted from the moment that the distance between the electrode and the workpiece exceeds 20 micrometers to the moment that the distance between the electrode and the workpiece is reduced again to 20 micrometers. In the present case, the machining cycles had a duration of maximally approximately 0.25 second. A cycle comprises a first period of 3–200 ms, in which a voltage difference is maintained between the foil and the workpiece, and a second period of 10–50 ms, during which the voltage is interrupted. During said first period, a distance of 20 micrometers between the electrode and the foil was maintained. During said second period, the distance was, successively, increased to 250 micrometers and reduced to 20 micrometers.

In the embodiment described hereinbefore, the space between the sub-electrodes 2 was filled entirely with an electrically insulating material 7, such as POM (polyoxymethylene). By virtue thereof, a flat electrode surface 8 was obtained. This has the advantage that electrolyte liquid cannot penetrate between the sub-electrodes. As a result, the stray field of the electrodes is reduced. This leads to a higher accuracy of the impression made by the sub-electrodes in the foil. It is noted that this measure is feasible only if thin foils must be provided with a hole pattern. If workpieces are used whose thickness exceeds 50 micrometers, this measure is not feasible. In that case, the electrodes must partly penetrate into the workpiece. In this case, the insulating material must be (partly) omitted.

After the electrochemical machining process, the workpiece 3 was removed from the substrate 4. By means of visual inspection it was established that the edges formed at the surface of the foil situated on the substrate hardly exhibit rounding. If use is made of the measure in accordance with the invention, the radius of rounding is less than 5 micrometers. In this case, the radius of rounding was approximately 2–4 micrometers. If the foil is not clamped onto the substrate during machining, a substantial degree of rounding occurs at said edges. In this case, the radius of rounding exceeds 20 micrometers. It has been found that the radius of rounding of the edges which, during machining, are situated at the free surface of the foil is relatively large, i.e. in excess of 30 micrometers. This value is hardly influenced by the provision, or not, of the foil on the substrate.

Figure 2:
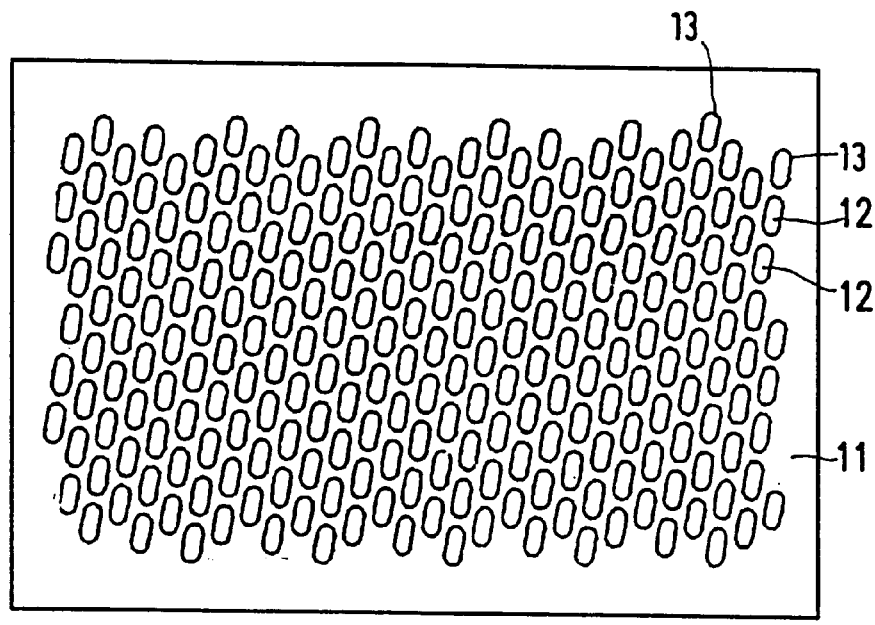
FIG. 2 shows a finished shaving foil, which is manufactured by means of the method in accordance with the invention.

FIG. 2 shows a shaving foil which can be manufactured very advantageously by means of the method in accordance with the invention. Said shaving foil comprises a flat, rectangular foil 11 of a flexible metal in which a pattern of hair-entry apertures 12 is provided in the form of oval through-holes. This pattern is provided by means of electrochemical machining in accordance with the inventive method, the electrode of the ECM apparatus being provided with a regular pattern of oval sub-electrodes.

When the pattern of holes was formed, the foil was clamped onto a substrate which was predominantly composed of Pt. In this manner, it was achieved that the edges 13 forming the boundary between the holes and the surface of the foil contacting the substrate during machining exhibit a relatively small radius of rounding. If said shaving foil is used in a shaver, a cutter system presses on the foil surface having the small radius of rounding. When the shaver is in operation, said cutter system moves past the foil, so that the edges 13 serve as cutting faces for the cutter system. Consequently, these edges should exhibit a relatively small degree of rounding. Measuring data and fitting data showed that the average radius of rounding of these edges was less than 4 micrometers.

Figure 3:
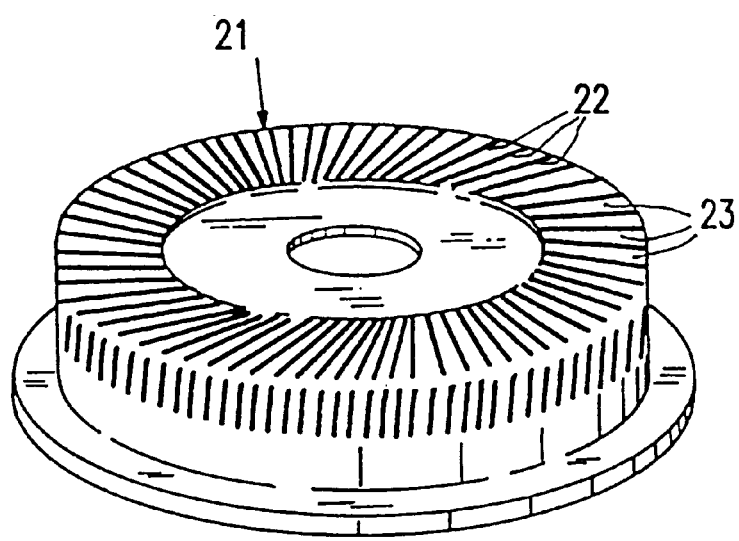
FIG. 3 shows a finished shaving comb, which is manufactured by means of the method in accordance with the invention.

FIG. 3 shows a shaving comb which is manufactured very advantageously by means of the method in accordance with the invention. The shaving comb comprises a substantially flat, circular wall portion 21 of a metal. The wall portion is provided with a pattern of grooves 22 which, in a radial sectional view, are U-shaped, said grooves being provided by means of the method in accordance with the invention. These grooves 22 divide a substantial part of the wall portion 21 into lamellae 23.

When the grooves are provided by means of an ECM operation, the inside surface of wall portion 22 is clamped onto an electroconductive, electrochemically inert substrate. In this manner, it is achieved that the edges which form the boundary between the grooves 8 and said inside surface exhibit a small rounding. When this shaving comb is used in a shaver, a cutter system presses on this inside surface. When the shaver is in operation, this cutter system rotates past this inside surface of wall portion 21, so that said edges serve as the cutting faces for the cutter system. Consequently, these edges should not exhibit rounding. Measuring data and fitting data have shown that the average radius of rounding of said edges was less than 4 micrometers.

This invention relates to a method of providing one or more through-holes in a metal workpiece, such as shaving foils or shaving combs, by means of an electrochemical machining apparatus (ECM apparatus). To this end, the method is characterized in that, during machining, the workpiece is provided on a substrate of an electroconductive, electrochemically inert material. In this manner, rounding of the edges between the holes formed and the surface of the workpiece, which is clamped down on the substrate during machining, is reduced to a substantial degree. This has a favourable effect on the formation of sharp cutting faces.

We claim:

1. A method of forming by means of an electrochemical machining apparatus comprising an electrode, one or more through-holes in a metal workpiece in which radius of rounding at the surface facing away from the electrode does not exceed 20 micrometers, which method comprises the step of providing the workpiece on a substrate of an electroconductive, electrochemically inert material during the machining operation.

2. A method as claimed in claim 1, wherein the inert material is predominantly composed of a substance selected from the group of a noble metal and alloys thereof.

3. A method as claimed in claim 2, wherein the material is predominantly composed of platinum.

4. A method as claimed in claim 3, wherein, during machining, the workpiece is clamped onto the substrate.

5. A method as claimed in claim 3, wherein the substrate contains one or more holes which are arranged to receive one or more parts of the electrode during machining.

6. A method as claimed in claim 3, wherein the distance between the electrode and the workpiece is periodically increased and during said increase, the flow of electric current between the workpiece and the electrode is interrupted.

7. A method as claimed in claim 3, wherein the workpiece is a shaving foil.

8. A method as claimed in claim 3, wherein the workpiece is a shaving comb.

9. A method as claimed in claim 2, wherein the substrate contains one or more holes which are arranged to receive one or more parts of the electrode during machining.

10. A method as claimed in claim 9, wherein the distance between the electrode and the workpiece is periodically increased and during said increase, the flow of electric current between the workpiece and the electrode is interrupted.

11. A method as claimed in claim 9, wherein the workpiece is a shaving foil.

12. A method as claimed in claim 9, wherein the workpiece is a shaving comb.

13. A method as claimed in claim 2, wherein the material is predominantly composed of platinum.

14. A method as claimed in claim 2, wherein, during machining, the workpiece is clamped onto the substrate.

15. A method as claimed in claim 2, wherein the substrate contains one or more holes which are arranged to receive one or more parts of the electrode during machining.

16. A method as claimed in claim 2, wherein the distance between the electrode and the workpiece is periodically increased and during said increase, the flow of electric current between the workpiece and the electrode is interrupted.

17. A method as claimed in claim 2, wherein the workpiece is a shaving foil.

18. A method as claimed in claim 2, wherein the workpiece is a shaving comb.

19. A method as claimed in claim 1, wherein, during machining, the workpiece is clamped onto the substrate.

20. A method as claimed in claim 19, wherein the substrate contains one or more holes which are arranged to receive one or more parts of the electrode during machining.

21. A method as claimed in claim 19, wherein the distance between the electrode and the workpiece is periodically increased and during said increase, the flow of electric current between the workpiece and the electrode is interrupted.

22. A method as claimed in claim 19, wherein the workpiece is a shaving foil.

23. A method as claimed in claim 19, wherein the workpiece is a shaving comb.

24. A method as claimed in claim 1, wherein the distance between the electrode and the workpiece is periodically increased and during said increase, the flow of electric current between the workpiece and the electrode is interrupted.

25. A method as claimed in claim 1, wherein the workpiece is a shaving foil.

26. A method as claimed in claim 1, wherein the workpiece is a shaving comb.

27. A workpiece manufactured as claimed in claim 1, wherein the workpiece is composed of chromium steel.

* * * * *